US010606934B2

(12) United States Patent
Helmes et al.

(10) Patent No.: US 10,606,934 B2
(45) Date of Patent: Mar. 31, 2020

(54) GENERATION OF A MODIFIED UI ELEMENT TREE

(71) Applicant: Microsoft Technology Licensing, LLC, Redmond, WA (US)

(72) Inventors: John Franciscus Marie Helmes, Steyl (NL); James Scott, Cambridge (GB); Stuart Alastair Taylor, Cambridge (GB); Stephen Edward Hodges, Cambridge (GB); Nicholas Yen-Cherng Chen, Cambridge (GB); Tobias Alexander Grosse-Puppendahl, Cambridge (GB); Josh Fromm, Seattle, WA (US); Pascal Knierim, Munich (DE); Gavin Wood, Cambridge (GB); Albrecht Schmidt, Satteldorf (DE); Thomas Denney, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 298 days.

(21) Appl. No.: 15/089,268

(22) Filed: Apr. 1, 2016

(65) Prior Publication Data

US 2017/0286371 A1   Oct. 5, 2017

(51) Int. Cl.
*G06F 3/048* (2013.01)
*G06F 17/22* (2006.01)
(Continued)

(52) U.S. Cl.
CPC ............ *G06F 17/227* (2013.01); *G06F 9/451* (2018.02); *G06F 17/212* (2013.01); *G06F 17/24* (2013.01);
(Continued)

(58) Field of Classification Search
CPC ........ G06F 17/227; G06F 9/451; G06F 17/24; G06F 17/212; G06F 3/048; G09G 5/005;
(Continued)

(56) References Cited

U.S. PATENT DOCUMENTS 7,581,034 B2    8/2009  Polivy et al.
7,711,868 B2    5/2010  Rhoten et al.
(Continued)

FOREIGN PATENT DOCUMENTS

CN    203896400 U      10/2014
WO   WO2008084549 A1    7/2008

OTHER PUBLICATIONS

Paiano, et al., "EB2000: A Structured Approach to the Creation of E-Books", In Proceedings of the IEEE Sixth International Symposium on Multimedia Software Engineering, Dec. 13, 2004, 7 Pages.
(Continued)

*Primary Examiner* — Jeanette J Parker
(74) *Attorney, Agent, or Firm* — Schwegman Lundberg & Woessner, P.A.

(57) ABSTRACT

A computing device comprises an electronic paper display, a processor and a memory. The memory is arranged to store platform software and application software for at least one application that is not adapted to work with an electronic paper display. The platform software comprises a UI conversion module comprising device-executable instructions, which when executed by the processor, cause the processor to: access a UI element tree for the application; generate a modified UI element tree for the application by removing and/or re-styling at least one UI element; and render data from the application using the modified UI element tree for display on the electronic paper display.

19 Claims, 8 Drawing Sheets

(51) Int. Cl.
*G06F 9/451* (2018.01)
*G06F 17/21* (2006.01)
*G06F 17/24* (2006.01)
*G09G 5/00* (2006.01)

(52) U.S. Cl.
CPC .......... *G09G 5/005* (2013.01); *G09G 2354/00* (2013.01); *G09G 2360/02* (2013.01); *G09G 2360/121* (2013.01)

(58) Field of Classification Search
CPC ........... G09G 2360/02; G09G 2354/00; G09G 2360/121
See application file for complete search history.

(56) References Cited

U.S. PATENT DOCUMENTS

| | | | |
|---|---|---|---|
| 7,733,335 | B2 | 6/2010 | Zehner et al. |
| 7,990,338 | B2 | 8/2011 | Teng et al. |
| 8,593,401 | B1 | 11/2013 | Kim et al. |
| 8,629,814 | B2 | 1/2014 | Teng et al. |
| 8,760,363 | B2 | 6/2014 | Lin et al. |
| 8,823,722 | B1 | 9/2014 | Huang et al. |
| 8,898,398 | B2 | 11/2014 | Izadi et al. |
| 9,158,135 | B1 | 10/2015 | Chaboud et al. |
| 9,727,293 | B1* | 8/2017 | White ................... G06F 3/14 |
| 9,740,791 | B1* | 8/2017 | Killian ............... G06F 17/2247 |
| 2005/0243346 | A1 | 11/2005 | Foehr et al. |
| 2007/0271522 | A1* | 11/2007 | Son ................... G06F 9/44505 715/762 |
| 2007/0279350 | A1 | 12/2007 | Huang et al. |
| 2008/0072163 | A1 | 3/2008 | Teng et al. |
| 2008/0086778 | A1* | 4/2008 | Asahara ............... H04N 1/4406 726/26 |
| 2008/0235634 | A1* | 9/2008 | Stefani ................ G06F 3/0482 715/866 |
| 2010/0023788 | A1 | 1/2010 | Scott et al. |
| 2011/0084979 | A1 | 4/2011 | Rutman et al. |
| 2011/0145249 | A1* | 6/2011 | Joshi ................... G06F 16/81 707/738 |
| 2011/0242007 | A1* | 10/2011 | Gray .................. G06F 3/0488 345/173 |
| 2011/0260948 | A1 | 10/2011 | Teng et al. |
| 2012/0166985 | A1 | 6/2012 | Friend et al. |
| 2012/0260157 | A1* | 10/2012 | Zhu ................... G06F 17/30902 715/234 |
| 2014/0002365 | A1 | 1/2014 | Ackley et al. |
| 2014/0184471 | A1 | 7/2014 | Martynov et al. |
| 2014/0310643 | A1 | 10/2014 | Karmanenko et al. |
| 2014/0340282 | A1 | 11/2014 | Chen et al. |
| 2015/0015573 | A1 | 1/2015 | Burtzlaff et al. |
| 2015/0042539 | A1 | 2/2015 | Avrahami |
| 2015/0198978 | A1* | 7/2015 | Catchpole ............. G06F 1/1632 345/173 |
| 2015/0255036 | A1 | 9/2015 | Esfahani et al. |
| 2016/0062964 | A1* | 3/2016 | Choi ................... G06F 17/2247 715/234 |
| 2016/0070682 | A1* | 3/2016 | Furtwangler ............. G06F 8/38 715/234 |
| 2016/0349868 | A1 | 12/2016 | Kim et al. |
| 2017/0161240 | A1* | 6/2017 | Lee ..................... G06F 17/272 |
| 2017/0315971 | A1* | 11/2017 | Sakata ............... G06F 17/2247 |

OTHER PUBLICATIONS

"International Search Report and Written Opinion Issued in PCT Application No. PCT/US2017/024642", dated Jun. 29, 2017, 9 Pages.

Dementyev et al., "Wirelessly Powered Bistable Display Tags," In Proceedings of the ACM international joint conference on Pervasive and ubiquitous computing, Sep. 8, 2013, 4 pages.

Edwards, "Samsung-Galaxy-S6-To-Be-Accessory-King-E-Ink-Display-And-More-Add-Ons-Tipped," Published on: Jan. 28, 2015, Available at <<http://www.pocket-lint.com/news/132526-samsung-galaxy-s6-to-be-accessory-king-e-ink-display-and-more-add-ons-tipped>> 4 pages.

Laur, "PopSlate Case for Flexible Display Devices," Published on: Apr. 1, 2015, Available at <<http://www.flexible-display.net/popslate-case-for-flexible-display-devices/>> 5 pages.

Laur, "Vikaura Screen can last years without a new battery", Published on: Jan. 22, 2015, Available at <<http://www.flexible-display.net/vikura-screen-can-last-years-without-new-battery/>> 5 pages.

Miles, "Alcatel 4-inch E-ink display works as a reader companion," Published on: Jan. 6, 2014, Available at <<http://www.pocket-lint.com/news/126252-alcatel-4-inch-e-ink-display-works-as-a-reader-companion-for-your-phone>> 4 pages.

"Smartphone with Dual-Side Display; Courtesy Microsoft," Published on: Apr. 26, 2012, Available at <<http://www.eetindia.co.in/ART_8800665881_1800010_NT_170c31a6.HTM>> 3 pages.

Wang et al., "Photo-Switchable Bistable Twisted Nematic Liquid Crystal Optical Switch," In Journal of Optics Express, vol. 21, Issue 4, Feb. 12, 2013, pp. 4361-4366.

Woollaston, "Yota's double-sided mobile handset with e-book display to boost battery life launches in the UK," Published on: Dec. 3, 2014, Available at <<http://www.dailymail.co.uk/sciencetech/article-2858850/Yota-s-double-sided-handset-e-book-display-boost-battery-life-goes-sale-UK.html>> 17 pages.

Yirka, "E-paper display powered by NFC from smartphone (w/ Video)," Published on: Aug. 21, 2013, Available at: <<http://phys.org/news/2013-08-e-paper-powered-nfc-smartphone-video.html>> 3 pages.

* cited by examiner

GENERATION OF A MODIFIED UI ELEMENT TREE

BACKGROUND

Electronic paper (or e-paper) is used for e-reader devices because it only requires power to change the image displayed and does not require continuous power to maintain the display in between. The electronic paper can therefore hold static images or text for long periods of time (e.g. from several minutes to several hours and even several days, months or years in some examples) without requiring significant power (e.g. without any power supply or with minimal power consumption). In contrast, emissive displays which are used for the screens of most other portable computing devices (e.g. smartphones, smart watches, tablet computers, handheld games consoles, portable music players, digital cameras, etc.) require a significant amount of power to maintain an image on the display and the display can, therefore, be a dominant consumer of power in such devices which only have a limited battery life.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A computing device comprises an electronic paper display, a processor and a memory. The memory is arranged to store platform software and application software for at least one application that is not adapted to work with an electronic paper display. The platform software comprises a UI conversion module comprising device-executable instructions, which when executed by the processor, cause the processor to: access a UI element tree for the application; generate a modified UI element tree for the application by removing and/or re-styling at least one UI element; and render data from the application using the modified UI element tree for display on the electronic paper display.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
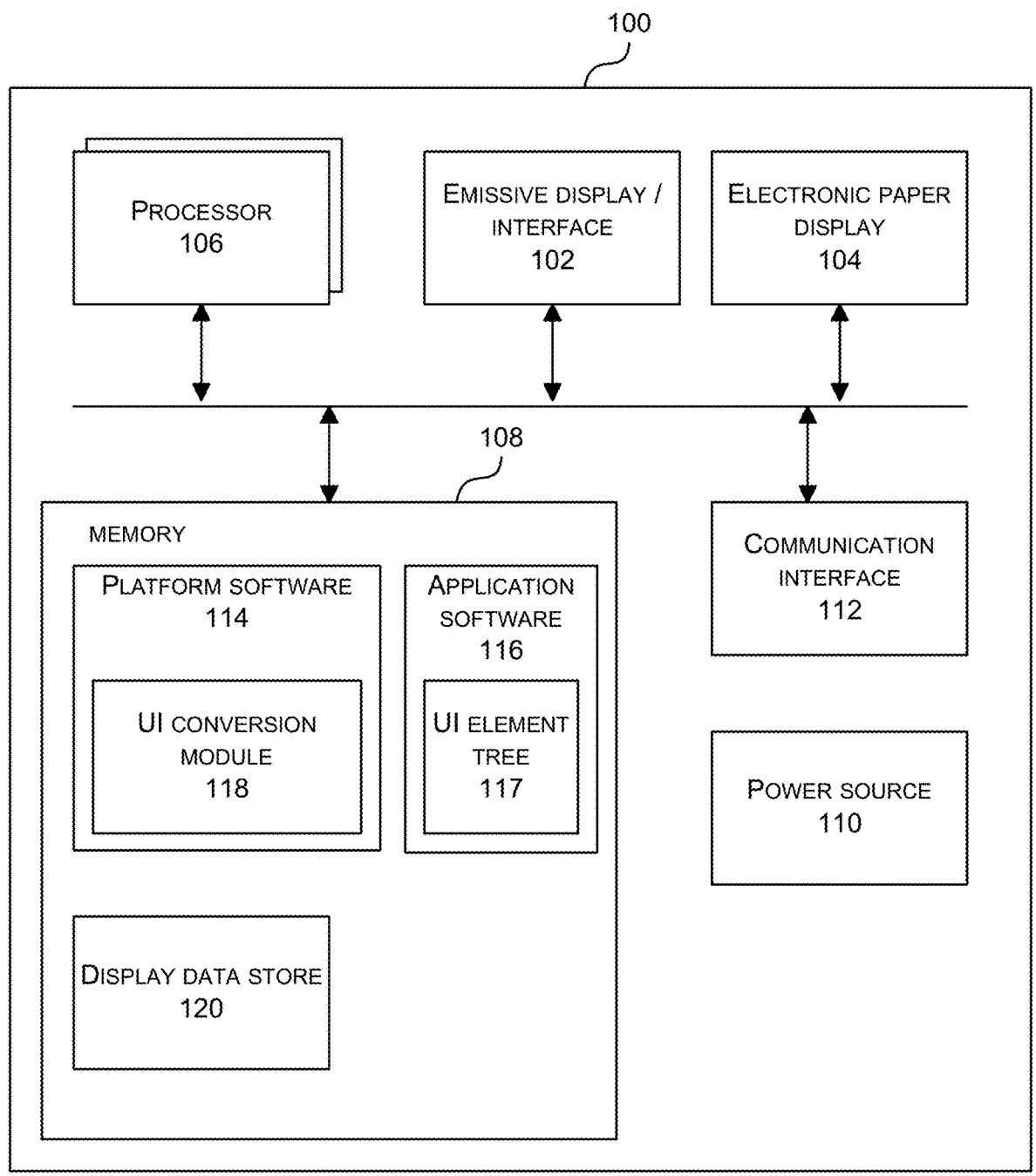
FIG. 1 is a schematic diagram of a first example computing device comprising an electronic paper display and an emissive display or an interface permitting direct control of an emissive display.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

The term "electronic paper" is used herein to refer to display technologies which reflect light (like paper) instead of emitting light like conventional LCD displays. As they are reflective, electronic paper displays do not require a significant amount of power to maintain an image on the display and so may be described as persistent displays. Many electronic paper displays are multi-stable displays. In some display devices, an electronic paper display may be used together with light generation in order to enable a user to more easily read the display when ambient light levels are too low (e.g. when it is dark). In such examples, the light generation is used to illuminate the electronic paper display to improve its visibility rather than being part of the image display mechanism and the electronic paper does not require light to be emitted in order to function.

The term "multi-stable display" is used herein to describe a display which comprises pixels that can move between two or more stable states (e.g. a black state and a white state and/or a series of grey or colored states). Bi-stable displays, which comprise pixels having two stable states, are therefore examples of multi-stable displays. A multi-stable display can be updated when powered, but holds a static image when not powered and as a result can display static images for long periods of time with minimal or no external power. Consequently, a multi-stable display may also be referred to as a "persistent display" or "persistently stable" display. An electrophoretic ink layer is an example of a multi-stable layer which can be changed (or controlled) by applying electric fields. Other examples include a cholesteric liquid crystal layer or a bi-stable electrowetting display layer which is controlled using electric fields or currents applied via electrodes on the faces of a the layer.

As a consequence of the technologies used to build electronic paper displays, the visual properties of the display are different to the properties of an emissive display. As well as potential differences in physical size of display, the resolution, update rate, aspect ratio and dynamic range (greyscale/color fidelity) may be different. This means that although visual information may be clear and easily readable when displayed on an emissive display, if the same visual information is instead displayed on an electronic paper display, the visual information may be unclear or unreadable.

Additionally, while emissive displays are often touch-sensitive (and hence are interactive), an electronic paper display may not provide input sensing mechanisms, or where provided the input sensing mechanisms may be more restrictive than (or otherwise different to) those typically provided for emissive displays. The difference in interactivity may be a consequence of different input mechanisms being provided (e.g. a limited number of hard controls instead of a touch-sensitive display) and/or the different output capabilities of the electronic paper display itself (e.g. because of a lower refresh rate and/or to conserve power by reducing the number of refreshes). For example, an emissive display may present a smoothly scrolling interface (controlled by touch) where the scrolling can be accomplished down to the pixel or even sub-pixel level, and update fast enough to be smoothly scrolling to the user's perspective, e.g. at 50 Hz. In contrast, on an electronic paper display, such an interface may be slow to update (e.g. 2 Hz). The difference in or lack of interactivity means that if visual information including interactive user interface (UI) elements is displayed on an electronic paper display instead of an emissive display, this may mislead the user into expecting a degree of interactivity that cannot be achieved and hence provide an inferior user experience.

Although some applications (i.e. some application software) have been written with an awareness of electronic paper displays, there are very many applications which have no awareness. As use of electronic paper displays becomes more common, it is not feasible to expect developers to modify every existing application and write all new applications to be aware of electronic paper displays. Similarly, it is not feasible to expect users to only use those applications which have been written or modified to have an awareness of electronic paper displays.

The embodiments described below are not limited to implementations which solve any or all of the disadvantages of known computing devices and/or software applications.

Described herein is a computing device that comprises an electronic paper display and may also comprise an emissive display or an interface permitting direct control of an emissive display. The electronic paper display may be integrated into a main part of the computing device or may be part of a detachable element. The computing device runs platform software (e.g. an operating system) on which application software runs. At least one of the applications which generates a graphical user interface (GUI) is not aware of the electronic paper display (i.e. the application software is not written in a way that is optimized for an electronic paper display or has not been modified to be optimized for an electronic paper display, e.g. the GUI and/or interactivity of the application is not optimized for an electronic paper display). The platform software underlying an unaware (e.g. unmodified) application has access to the UI element tree (e.g. the visual tree structure and/or logical tree structure) for the application and in response to a trigger to display the application (or to display information from the application) on the electronic paper display, the platform software is configured to examine the UI element tree, to remove, replace and/or re-style elements within the UI element tree and then render the data using the modified UI element tree. The rendered content is then ready for display on the electronic paper display and may be displayed immediately or cached for subsequent display.

By using an electronic paper display instead of an emissive display to display some of the UI some of the time, the overall power consumption of the computing device is reduced. Where the computing device is powered by an internal battery (or other internal power source) this extends the operating life of the device before it needs to be recharged. Where the electronic paper display is part of a detachable element, a user can take away some information on a very low power device.

In various examples, use of an electronic paper display to display cached content that has already been rendered, instead of displaying live content, may result in a lower latency (e.g. it may be faster to display and navigate through the information) and depending upon the type of information being displayed, the fact that the information is not live may not matter (e.g. where the information does not change that quickly, such as a long-range weather forecast, train timetable, etc.). This may allow the application to be closed (i.e. to stop running) and be removed from memory, thereby reducing the power consumption and memory usage of the computing device.

The computing device may, for example, be a portable or handheld computing device (e.g. a smart phone, laptop computer, tablet computer, handheld games console, wearable device, etc.) and the electronic paper display may be integral to the device or may be part of a detachable module (e.g. a detachable cover for a smart phone or tablet computer). Alternatively, the computing device 102 may be a non-portable computing device such as a desktop computer, smart television or games console and the electronic paper display may be part of a detachable element (or module) which is portable and which may, for example, be placed in a user's pocket or wallet or worn (i.e. it may be a wearable device).

In examples where the electronic paper display is part of a detachable element or module, the communication link between the detached element and the remainder of the computing device may have a limited bandwidth or there may be no communication link. By re-rendering the UI specifically for the electronic paper display (as described above), the connectivity (or lack thereof) between the detachable element and the remainder of the computing device can be taken into consideration (e.g. if there is no connectivity following separation, all the application's output that a user may expect to view may be cached and rendered for the electronic paper display ahead of separation as a closed set of information; however, if there is some connectivity following separation, an initial set of information may be cached and re-rendered prior to separation and further information may be subsequently re-rendered and communicated to the detachable element over the communication link). As an electronic paper display does not require power to maintain display of a static image, the detachable element does not necessarily require a battery (or other power source) or may comprise a small battery (or other power source) to enable limited user interaction with the displayed data.

FIG. 1 is a schematic diagram of an example computing device 100 comprising an emissive display 102 (or an interface permitting direct control of an emissive display) and an electronic paper display 104. The computing device 100 also comprises one or more processors 106 (e.g. a CPU and a GPU), a memory 108 and a power source 110. The computing device 100 may also comprise a communication interface 112. The computing device 100 may also comprise additional functional elements in addition to those shown in FIG. 1 (e.g. an input/output controller, a user input device, etc.).

Figure 2:
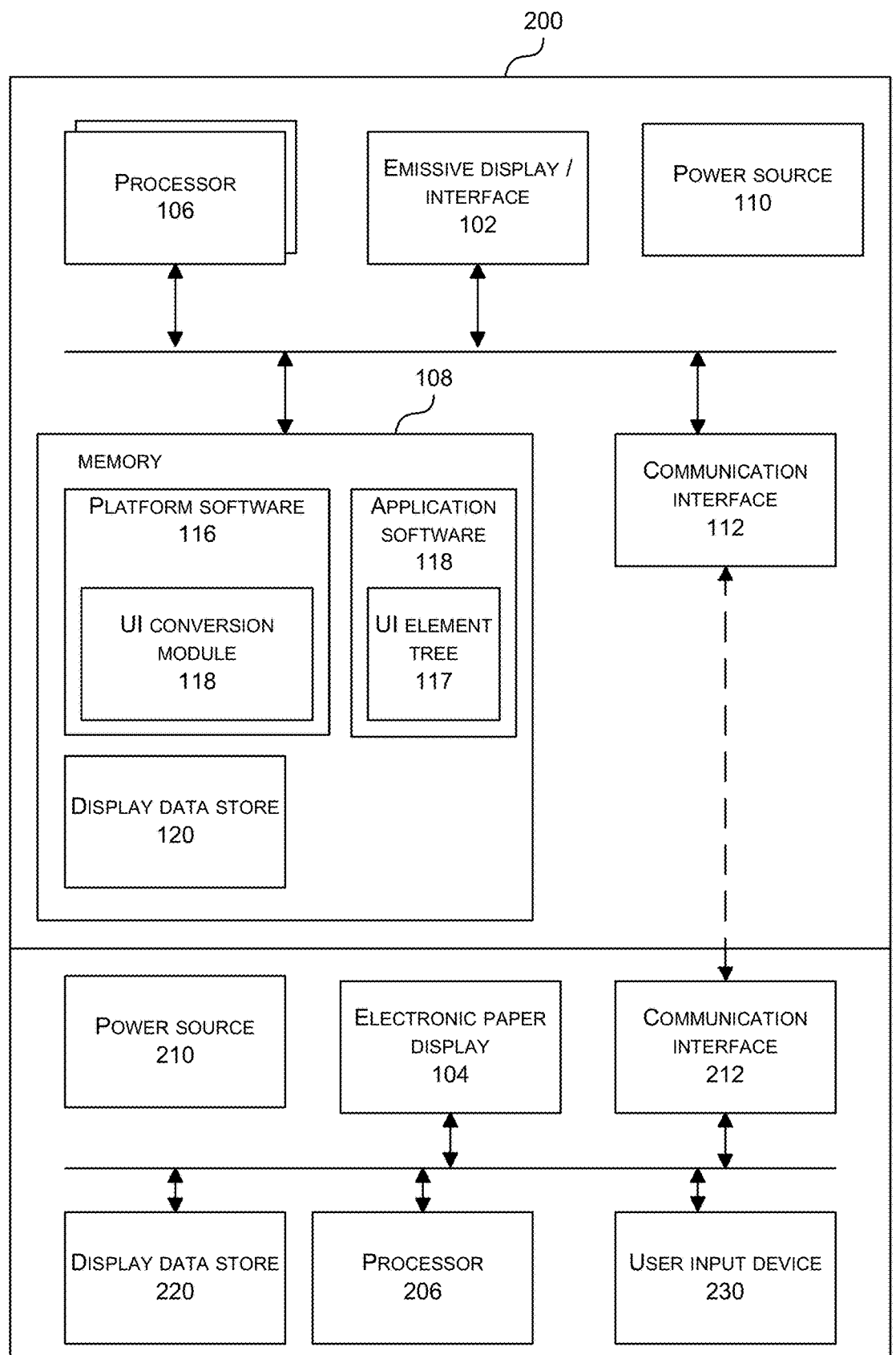
FIG. 2 is a schematic diagram of a second example computing device comprising an electronic paper display and an emissive display or an interface permitting direct control of an emissive display.

FIG. 2 is a schematic diagram of a second example computing device 200 comprising an emissive display 102 (or an interface permitting direct control of an emissive display) and an electronic paper display 104; however, in this example, the electronic paper display 104 is within a detachable module 202 (i.e. a module which is physically separable and when physically separated there is either no data connection or the data connection has a limited bandwidth compared to the data connection when it is not detached). The computing device 200 also comprises one or more processors 106 (e.g. a CPU and a GPU), a memory 108, a power source 110 and a communication interface 112. As shown in FIG. 2, the communication interface 112 provides a communication link to the detachable module 202 (via a communication interface 212 in the detachable module) and this may use a wired connection or a wireless connection. It will be appreciated that in addition, the communication interface 112 in the main part of the computing device 200 may also communicate with other computing devices (e.g. directly or via a network).

The detachable module 202 comprises the electronic paper display 104 and a communication interface 212. In addition it may comprise one or more of: a power source 210, a processor 206 (which may be significantly less powerful than the processor(s) 106 in the main part of the computing device 200), a user input device 230 and a display data store 220.

Figure 7:
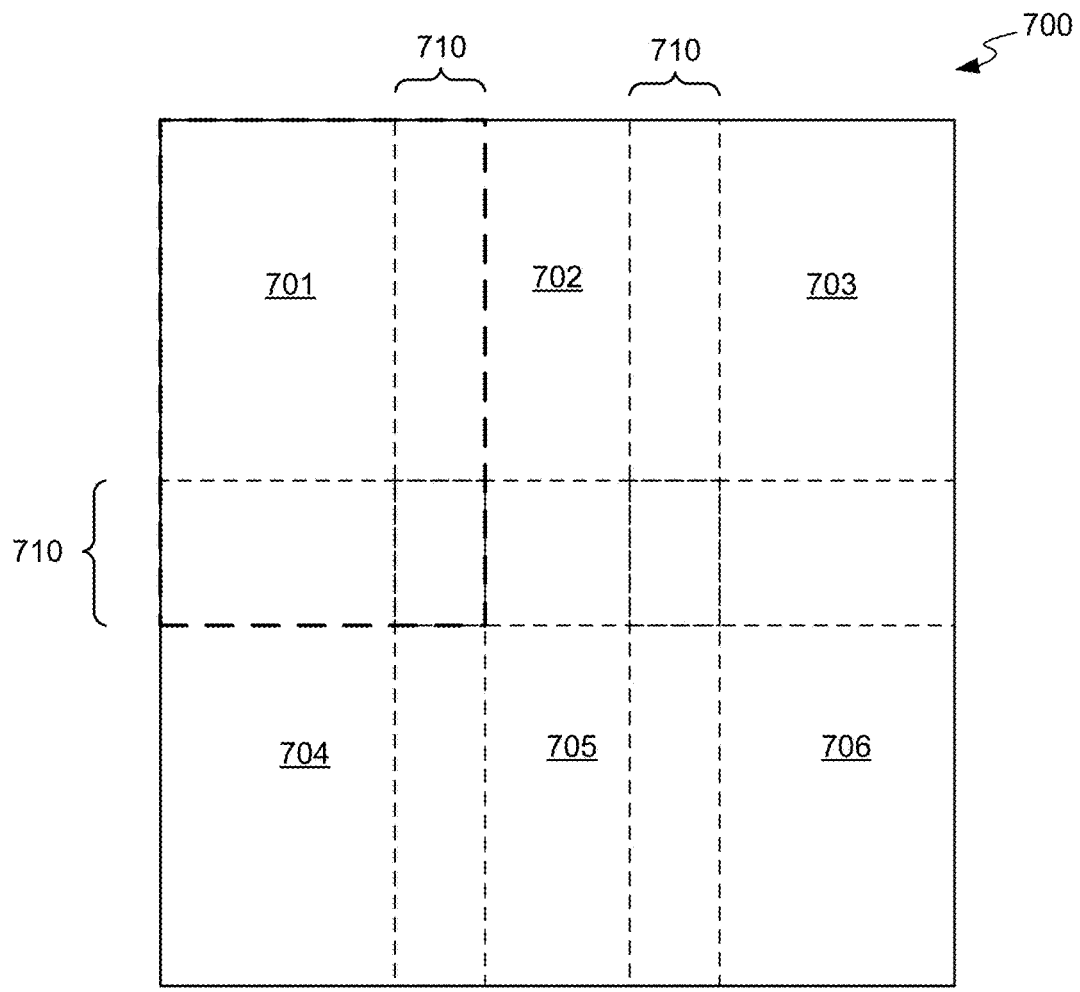
FIG. 7 shows schematic diagrams of two different pagination strategies.
Figure 7:
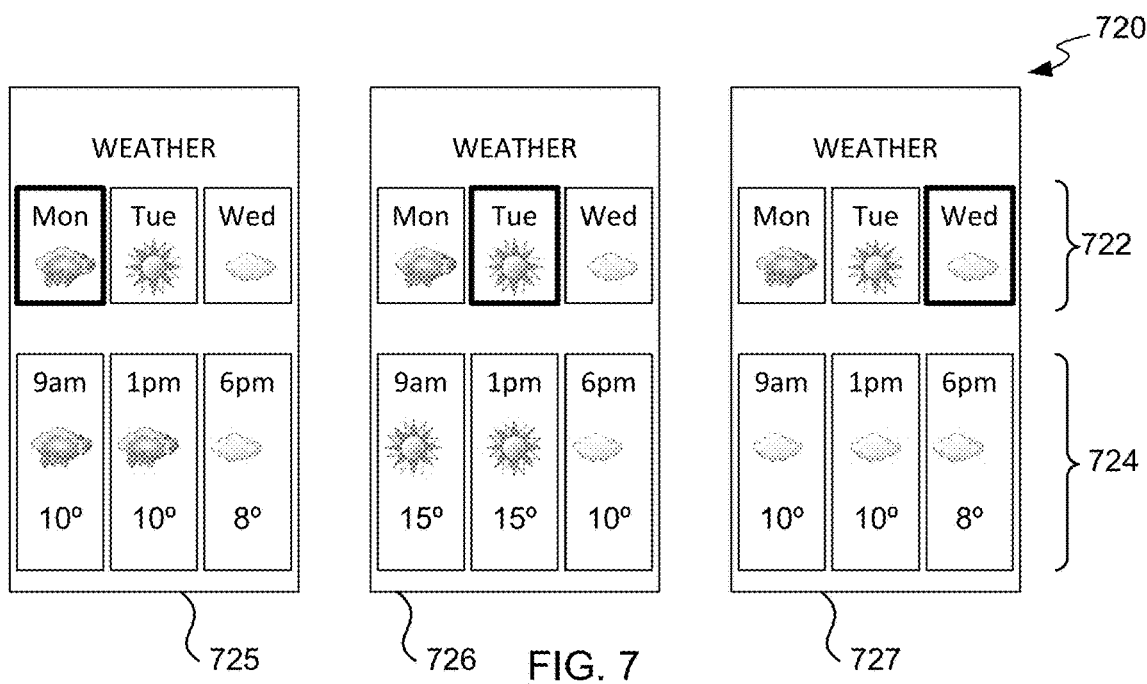

Once physically separated, the detachable module 202 may have no data connection with the rest of the computing device 200 and in such examples, the content displayed on the electronic paper display 104 may be fixed (e.g. if the detachable module 202 does not comprise a power source 210 and/or display data store 220). Alternatively the content may be limited to a fixed data set (stored in the display data store 220) comprising a plurality of re-rendered UI images (as described in more detail below with reference to FIG. 7) and different re-rendered UI images may be displayed on the electronic paper display 104 under the control of the processor 206 in response to a user input via a user input device 230 or autonomously (e.g. the processor 206 may display the re-rendered UI images sequentially without requiring user input).

In various examples, the detachable module 202 may have a limited bandwidth data connection to the rest of the computing device 200 when it is physically separated and in such examples, the limited bandwidth data connection may be used to receive trigger signals (e.g. to trigger the switching between the stored content of the fixed data set) or to receive further re-rendered content which has been re-rendered with an awareness of the limited bandwidth data connection.

The computing device 200 may also comprise additional functional elements in addition to those shown in FIG. 2 (e.g. the main part of the computing device 200 may additionally comprise an input/output controller, a user input device, etc.).

Figure 3:
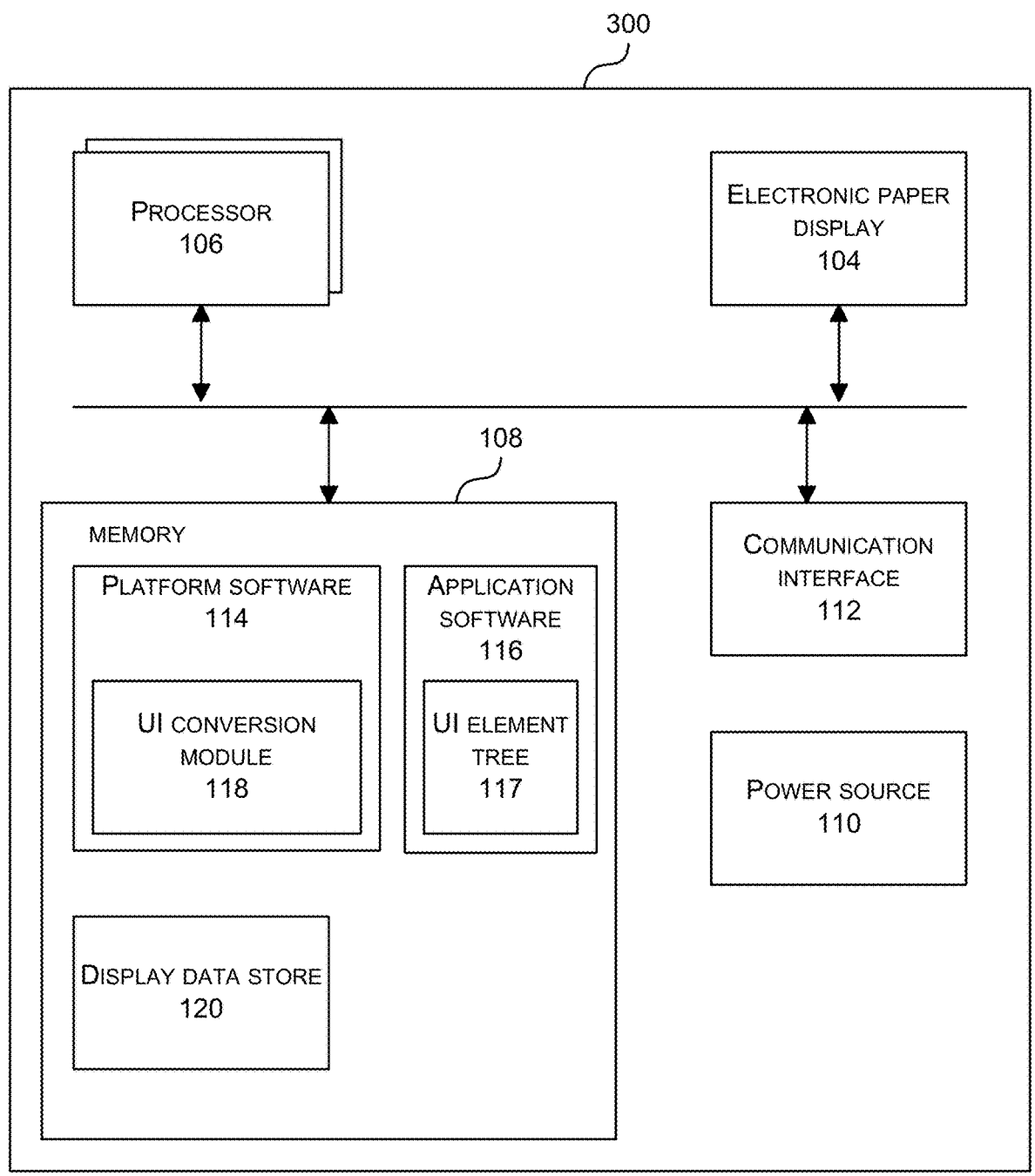
FIG. 3 is a schematic diagram of a third example computing device comprising an electronic paper display.
Figure 4:
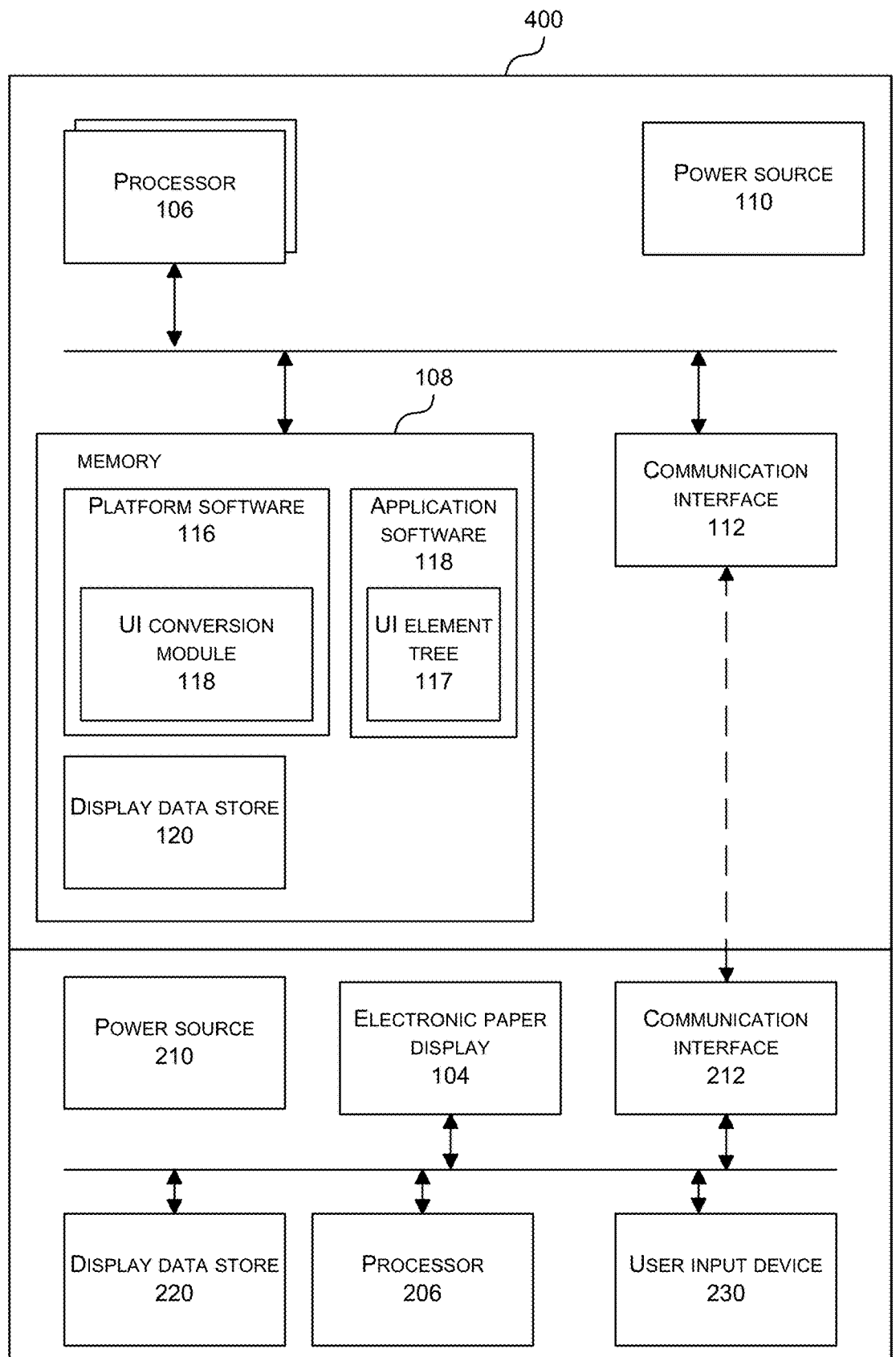
FIG. 4 is a schematic diagram of a fourth example computing device comprising an electronic paper display.

FIGS. 3 and 4 are schematic diagrams of third and fourth example computing devices 300, 400 comprising an electronic paper display 104; however, unlike the examples shown in FIGS. 1 and 2, the computing devices 300, 400 do not comprise an emissive display 102 or an interface permitting direct control of an emissive display. The computing device 300 shown in FIG. 3 otherwise corresponds to the computing device 100 shown in FIG. 1 and described above and the computing device 400 shown in FIG. 4 otherwise corresponds to the computing device 200 shown in FIG. 2 and described above.

The processors 106, 206 may be microprocessors, controllers or any other suitable type of processors for processing computer executable instructions to control the operation of the device in order to perform the methods described herein. In some examples, for example where a system on a chip architecture is used, the processors 106, 206 include one or more fixed function blocks (also referred to as accelerators) which implement a part of the methods described herein in hardware (rather than software or firmware). Alternatively, or in addition, the functionality described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

The processor 206 (where provided) in the detachable module 202 may not be the same as the processor 106 in the main part of the computing device 200 shown in FIG. 2, e.g. the processor 206 in the detachable module 202 may be a lower power processor and/or operate at a lower voltage than the processor 106 in the main part of the computing device 200 and/or the processor 106 in the main part of the computing device 200 may have more functionality (e.g. more processing power) than the processor 206 in the detachable module 202.

The computer executable instructions which are executed by the processor(s) 106 are provided using any computer-readable media that is accessible by the computing device 100, 200 and these computer executable instructions may include platform software 114 (e.g. an operating system) and application software 116. Computer-readable media includes, for example, computer storage media such as memory 108 and communications media. Computer storage media, such as memory 108, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 108) is shown within the computing devices it will be appreciated that part of the storage may, in some examples, be distributed or located remotely and accessed via a network or other communication link (e.g. using communication interface 112).

The power source 110 in the computing device 100, 200 may be any suitable power source including, but not limited to, a power supply which connects to a mains electricity supply, a battery or a power-harvesting system (e.g. a solar cell). Where the detachable module 202 also includes a power source 210 this may also be any suitable power source including any of the examples provided above. In some examples, however, the power source in the detachable module 202 may only provide a limited supply of power, e.g. it may be a smaller battery, capacitor or super-capacitor or may use power-harvesting, and in various examples, a power source 210 in the detachable module 202 may be charged by the power source 110 in the main part of the computing device 200 when the detachable module is physically connected to the main part of the computing device 200 (i.e. when it is not detached).

Figure 5:
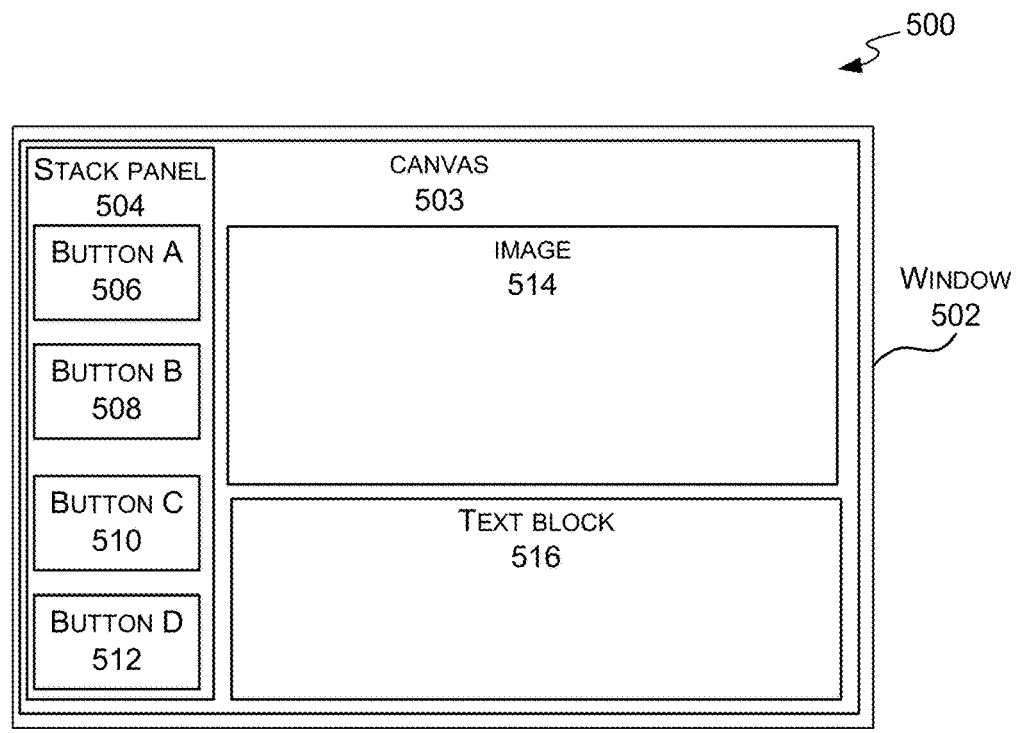
FIG. 5 is a schematic diagram showing an example UI and corresponding UI element tree.
Figure 5:
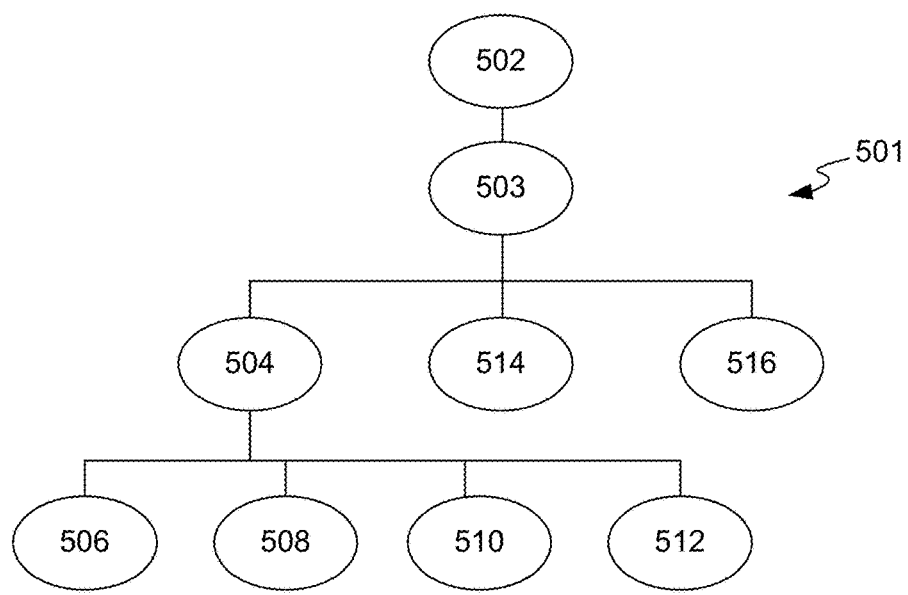

The software 116 for an application which is stored in the memory 108 of the computing device 100, 200 comprises a UI element tree 117. The UI element tree 117 (which may also be referred to as a 'visual tree' and/or a 'logical tree') describes all the elements that form the UI of the application and also the inter-relation between elements. An example 500 of a UI and a corresponding UI element tree 501 are shown in FIG. 5. The information contained within the UI tree for each element may comprise one or more of: coordinates (i.e. defining its location on screen), text, color, font, text size, other parameters defining the appearance or layout of the element when rendered (e.g. margins to nearby elements, alignment details, justification, etc.), a reference to an entry in a pre-existing styles-table that defines how the element should be rendered, a list of children for the element, etc. For example, for a text block (e.g. text block 516), the information may include the text (or a link to the text), the font to use, font size, whether to line wrap, whether the text is user-editable or read-only, etc. For an image block (e.g. image block 514), the information may include the image or a link to the image.

At least one of the applications which runs on the platform software 114 (and for which application software 116 is stored in the memory 108) and which generates a GUI is not written or modified to specifically accommodate display on an electronic paper display 104 and such an application is described as being not 'aware' of the electronic paper display 104.

The platform software 114 which is stored in the memory 108 of the computing device 100, 200 comprises a UI conversion module 118. The UI conversion module 118 comprises device-executable instructions which, when executed by a processor 106, cause the processor 106 to examine the UI element tree, to remove, replace and/or re-style elements within the UI element tree and thereby generate a modified UI element tree (i.e. a modified version of the UI element tree 117). The term 're-style' is used herein to refer to editing/modifying the parameters of an element within the UI element tree 117 (e.g. to change the font size, font size and/or display color). The modified UI element tree may be stored within the memory 108 for later use in rendering data or may be used immediately to render data and then discarded. Where the modified UI element tree is stored, it may be subsequently modified further (e.g. by the UI conversion module 118). The rendering of the data using the modified UI element tree and at the resolution of the electronic paper display 104 may be performed by the UI conversion module 118 or by other parts of the platform software (e.g. by a rendering module, not shown in any of FIGS. 1-4). The rendered content may be displayed immediately on the electronic paper display 104 or may be stored (in a display data store 120, 220) for later display (e.g. in response to a user input on the detachable module 202 when separated from the rest of the computing device 200).

The functionality provided by the UI conversion module 118 (i.e. the operations performed by the processor 106 when executing the device-executable instructions) can be described with reference to FIG. 6, although as described above, the rendering using the modified UI element tree and the outputting of the rendered data may be performed by the UI conversion module 118 or by another part of the platform software 114.

The method is initiated by a trigger which is received in relation to an application 116 which is not aware of the electronic paper display 104 (block 602). The trigger may be generated by the platform software 114 and may be generated in response to various actions or events.

In a first example, a user may indicate that they want to pin some data from the application to the electronic paper display 104 and this may be referred to as 'explicit pinning'. As the application is unaware of the electronic paper display 104, the triggering event may, for example, be a user interacting with the platform software by pressing a touch button on the computing device, tapping on the electronic paper display 104 (where this is touch-sensitive) or performing a gesture when the application is running and visible on the emissive display 102. Alternatively, the triggering event may be a user taking a screen capture from the application and selecting an option to display that screen capture on the electronic paper display 104. Using explicit pinning, the energy consumption used to display the data may be reduced compared to using the emissive display 102 because the emissive display 102 can be switched off.

In a second example, the platform software 114 or a specific application running on the platform software and which is aware of the electronic paper display 104 may generate the trigger autonomously, e.g. whenever a user switches between applications (e.g. any applications or particular applications), whenever a user closes a particular (unaware) application (e.g. a calendar application), periodically (e.g. every hour), when screen contents change significantly, etc. and this may be referred to as 'implicit pinning'. The platform software 114 (or the specific application) may learn from a user's activity what content they refer to often and/or what content they read at a particular time and may pre-emptively trigger the rendering of that content on the electronic paper display 104. This reduces the energy consumption of the computing device (because the user does not use the emissive display 102 to read the content) and reduces the latency experienced by the user (because the data is available and rendered ahead of when they require it).

In various examples, triggers may be generated autonomously in response to a change in state, or in response to an anticipated change in state, of the computing device 100, 200. For example, a trigger may be generated in response to a power level of the computing device falling below a threshold value (e.g. such that a loss of power is anticipated), anticipation of a loss of network connectivity (e.g. as detected by the signal strength falling below a threshold value), detachment of the detachable module 202, etc.

In response to the trigger (received in block 602), the processor 106 accesses the UI element tree 117 (block 604) for the relevant application 116 (or for multiple applications 116, where data is pinned from a collection of two or more applications at the same time) and generates a modified UI element tree (block 606). The modified UI element tree (as generated in block 606) is targeted specifically at the characteristics of the electronic paper display 104, although in various examples only parts of the UI element tree 117 which are relevant to the data being pinned may be modified and other parts of the UI element tree 117 (e.g. which relate to UI elements which are not being pinned) may be left unmodified, even if they are not suitable for rendering on the electronic paper display 104. If the electronic paper display 104 is part of a detachable module 202, the modifications to the UI element tree may also be based on the available bandwidth of a data connection between the module 202 when detached and the rest of the computing device (e.g. by using more plain surfaces and fewer images and icons where the available bandwidth is limited to ease image compression and/or using only a subset of a UI element's display characteristics where the available bandwidth is limited, such as the text/numbers but not color, font size, etc.).

Figure 6:
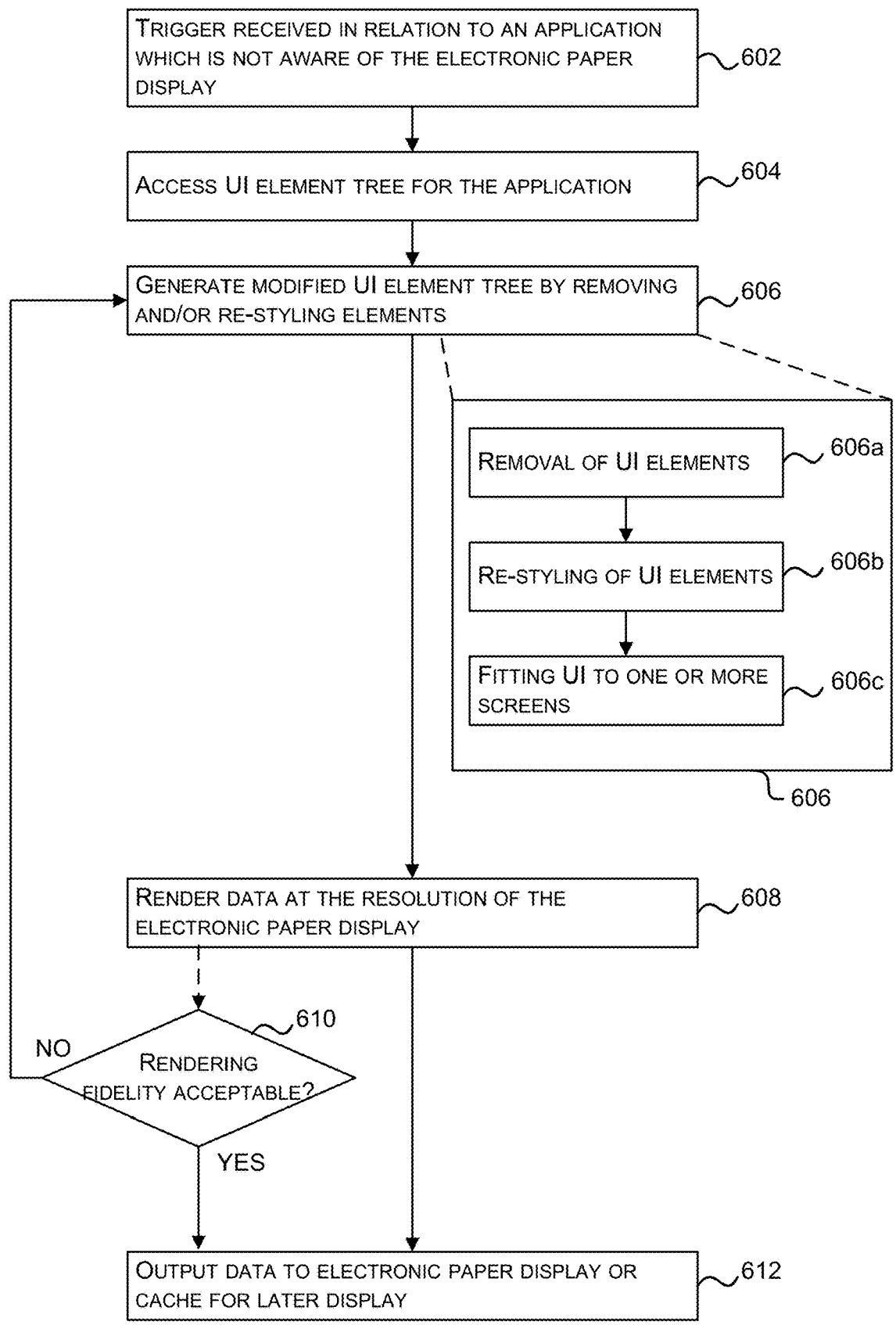
FIG. 6 is a flow diagram of an example method of generating a modified UI element tree which may be implemented by the computing device of any of FIGS. 1-4.

As described above, the UI element tree which is accessed (in block 604) may be the original, un-modified UI element tree for the application or may be a previously modified UI element tree (e.g. as generated in a previous iteration of the method of FIG. 6).

The generation of the modified UI element tree (in block 606) may comprise a number of stages: removal of UI elements (block 606a), re-styling of UI elements (block 606b) and fitting the UI (which is a GUI) to one or more screens (block 606c). In any implementation, none, one or more of these stages 606a-606c may be used and they may be implemented in a different order (e.g. re-styling before removal), although the fitting to one or more screens (in block 606c) is always performed after the removal of UI elements (in block 606a).

As shown in FIG. 6, those UI elements which are not supported by the electronic paper display 104 may be removed completely (in block 606a). The elements that are removed may include the platform software chrome (e.g. the start bar menu and the top bar), controls which link to other websites (e.g. which are not part of the data set that is being re-rendered for the electronic paper display), background images (e.g. which may make text unreadable on the electronic paper display because of its reduced dynamic range compared to an emissive display), etc. If the electronic paper display does not provide any interactivity, all interactive elements (e.g. buttons, check boxes, etc. may be removed). Examples of Universal Windows Platform (UWP) elements such as the AppBar may be removed. In various examples, usage-based analysis (e.g. for a user or for all users) may be used to determine which controls are rarely used and then these rarely used controls may be removed.

As also shown in FIG. 6, one or more UI elements may be re-styled (block 606b) by, for example, expansion of UI elements, marking UI elements as inactive, changing the color, size and border styling, etc. In an example, a border may be placed around text blocks (or other text elements) and a local contrast between the text and the background may be implemented within the border.

Many aspects of the re-styling that is performed (in block 606b) may be dependent upon the interactivity provided by the electronic paper display 104 (and also the detachable module 202, in the example shown in FIG. 2). If the electronic paper display 104 is touch-sensitive, some or all of the buttons may remain active (e.g. dependent upon the amount of content that is re-rendered and cached, with controls that point to content that is not being re-rendered being re-styled). In various examples, controls within the UI that relate to interactions that are not supported by the electronic paper display 104 may be removed (in block 606a), but in other examples, one or more controls may instead be marked as inactive by changing the appearance of the control (e.g. by greying out the control). Examples of UWP elements that may be greyed out include, but are not limited to, RadioButton, TextBox, CheckBox, etc.

Instead of removing or greying out a control which relates to an interaction that is not supported by the electronic paper display 104, the control may alternatively be replaced by one which is supported by the electronic paper display 104. This replacement of controls may be linked to the pagination strategy used (as described below with reference to block 606c) such that an original control is replaced by a new control dependent upon the pagination strategy.

The re-styling of UI elements (in block 606b) may also include aspects which are not related to the interactivity of the electronic paper display 104 (or detachable module 202) but are instead related to the visual properties of the electronic paper display 104, such as the dynamic range. To improve contrast and visual clarity on the electronic paper display 104 (compared to just rendering the same UI element tree as used on the emissive display 102), the background color, text size/color and/or borders of UI elements may be changed.

As shown in FIG. 6, after the removal of UI elements (in block 606a) and/or re-styling of UI elements (in block 606b), the UI may be fitted to one or more screens (in block 606c). This may, for example, involve applying a pagination strategy (e.g. which fits the UI to a plurality of screens) or forcing the UI elements to fit onto a single screen or a limited number of screens (e.g. because for electronic paper displays, updating the displayed content uses a lot of power and so the energy consumption is reduced by forcing the UI onto a smaller number of screens as long as it is still readable). Where the UI is fitted to more than one screen (in block 606c), this may involve the addition of new UI elements to enable a user to navigate between screens and in various examples, these new UI elements may effectively replace other UI elements which were removed (in block 606a). Where the UI is fitted to a single screen (in block 606c), this may involve the removal of UI elements (e.g. interactive elements) if these have not already been removed (in block 606a).

When a child UI element (e.g. any of elements 503-512 in FIG. 5) or the root UI element (e.g. element 502 in FIG. 5) has a scroll bar, that UI element may be resized to display all the information contained (e.g. in block 606b or 606c). Consequently, the scroll bar can be removed. When the resulting size is greater than the display dimension, a pagination strategy or other scheme to fit the UI elements onto a limited number of screens may be applied (in block 606c) as described below. This expansion method applies for numerous UWP elements such as RichTextBlock, Canvas, TextBlock, etc.

As described above, when the expanded application (from block 606b) has a larger size (e.g. height and/or width) than the resolution of the electronic paper display 104 allows for, a pagination strategy or alternative scheme may be applied (in block 606c). In an example, a number of re-rendered UI images 701-706 may be created by the UI conversion module 118 which cover different parts of the expanded application 700 (in block 606c, as shown graphically in the upper part of FIG. 7) and then the interactivity provided by the electronic paper display 104 (or the detachable module 202) may be used to enable the user to switch between re-rendered UI images. These re-rendered UI images do not correspond to the original, native, interactivity of the application but are generated specifically for rendering on the electronic paper display 104. If the multiple re-rendered UI images include overlapping portions 710, as shown in the upper part of FIG. 7, a scrolling feeling may be conveyed on the electronic paper display 104. This type of pagination strategy, as shown in the upper part of FIG. 7, may be referred to as 'scroll-view pagination'. Alternatively, there may be no overlapping portions 710 and a user may move between non-overlapping re-rendered UI images.

An alternative pagination strategy is 'in-app pagination' and this may be applied where an application offers multiple views. This may, for example, be implemented in a weather application, as shown in the lower part 720 of FIG. 7, where in the live application a user can click on part of a UI screen 722 to select a day of the week and this results in a change to parts of the content 724 (e.g. the part showing the detailed weather forecast for the day), but not the whole page, as shown in the lower part 720 of FIG. 7.

To determine which views of an application to expand for in-app pagination (because the re-rendering is done in advance of the user clicking to update the display), the UI conversion module 118 may record user actions within an application and learn their likely sequence of touch events, or alternatively cloud-based learning may be used and the reference data provided to the UI conversion module 118 (where the reference data is generated from many users actions). Depending upon the likely (or anticipated) sequence, a plurality of re-rendered UI images 725-727 may be generated (e.g. by capturing a navigable set of data) and the interactions between them defined and this is stored in the modified UI element tree. The interactions are selected to be compatible with the electronic paper display 104 (and associated hardware, such as the hardware in the detachable module 202) and enable the user to switch between re-rendered UI images 725-727 as if they were interacting with the live application, whilst instead interacting with the re-rendered UI images.

In various examples, the pagination strategy used may minimize differences between the different pages (e.g. differences where a greyscale level is involved) as this reduces the time taken to switch between the re-rendered UI images and in various examples, the energy consumption of the switch operation.

By using a pagination strategy as described above, a user has the ability to interact with application data (as displayed on the electronic paper display 104) even if the application itself is no longer running. This reduces power consumption both through the use of an electronic paper display 104 (instead of an emissive display 102) and through the application no longer running.

The modification of the UI element tree that results in the UI being fitted to multiple screens (in block 606c) may split the single UI element tree (as accessed in block 604) into multiple UI element trees and this transfers the complexity of the renderer to the UI conversion module 118. For example, a UI tree (or part thereof) may have the form:

```
<tabs>
    <item id="Tab 1">Information in tab 1</item>
    <item id="Tab 2">Information in tab 2</item>
</tabs>
```

And this may be treated as:
  Show tab 1→re-rendered image
  Show tab 2→re-rendered image
Alternatively, two trees may be generated from the original UI tree (or part thereof) to reduce the complexity of the renderer:

```
<tabs>
    <item id="Tab 1">Information in tab 1</item>
</tabs>
<tabs>
    <item id="Tab 2">Information in tab 2</item>
</tabs>
```

This could then be treated as:
  Show UI tree 1→re-rendered image
  Show UI tree 2→re-rendered image
As described above and in the example of FIG. 2, the re-rendered data (from block 608) may be displayed to a user after the detachable module 202 has been disconnected from the rest of the computing device 200 and there may be no communication link between the two parts or only a limited bandwidth link. By using a pagination strategy, a user can still interact with the application data despite the disconnection state and this provides a low power device (e.g. due to the use of an electronic paper display 104 and lack of network connectivity).

Once the modified UI element tree has been generated (in block 606), the application data is re-rendered at the resolution of the electronic paper display 104 and using the modified UI element tree (block 608). The re-rendered data (from block 608) may be displayed immediately on the electronic paper display 104 or cached for later display (block 612), where the data may be cached in the memory 108 (e.g. in a display data store 120) or in a separate memory (display data store 220) within the detachable module 202 comprising the electronic paper display 104.

As shown in FIG. 6, in various examples, the generation of a modified UI element tree (in block 606) may be embedded into an iterative process which checks that the re-rendered data (from block 608) achieves a target fidelity (e.g. it achieves at least a minimum pre-determined level of contrast). If the target fidelity is not achieved ('No' in block 610), the modified UI element tree is further modified (in block 606). This may, for example, allow an initial re-rendering without removing a background image (but instead leaving it unchanged or modifying it to reduce its dynamic range or modifying the text to use a grey that is unused in the background image) and if the re-rendering does not meet the required quality ('No' in block 610), the background image may be removed in the second iteration (e.g. in block 606a). The fidelity assessment (in block 610) may compare the difference in contrast of the background and foreground to a threshold. For example the fidelity assessment may determine if the background and foreground parts of the data use a separate (non-overlapping) range of greys (on a greyscale electronic paper display), e.g. with the background being limited to a set comprising a plurality of the lightest greys and the foreground being limited to a set comprising a plurality of the darkest greys and the two sets not overlapping and being separated by a minimum amount. In another example, this assessment of similar greys (as part of the fidelity assessment in block 610) may only be performed in a region where there is text (e.g. so that it is acceptable for the background image to be dark in places where there is no text, but in regions where there is dark text, the background image is required to be relatively light in color).

In addition to, or instead of, iterating the method to achieve a target fidelity, the method may be iterated to achieve a target data rate (e.g. where there is a limited bandwidth data connection between the main part of the computing device 200 and the detachable module 202).

Although FIG. 6 shows the fidelity assessment (in block 610) being performed after the generation of the modified UI element tree (in block 606) and re-rendering (in block 608), in various examples, there may be a fidelity check performed earlier (in addition to, or instead of, the one in block 610) to determine whether it is necessary to modify the UI element tree. For example, a fidelity assessment may be performed based on the existing UI element tree (i.e. prior to block 602)

and if the target fidelity is not achieved then this may generate the trigger (which is received in block 602).

In examples where a fidelity assessment is not performed at all (i.e. block 610 is omitted), the generation of the modified UI element tree (in block 606) may be rules based and the same modifications/actions may be performed for all UI element trees. For example, a rule-based 'search and replace' may be performed (in block 606), e.g. remove all background images, set all text colors to a predefined color (or to perform a predefined conversion to a specific set of colors), etc.

By using the method shown in FIG. 6 (and described above), the computing device 100, 200, 300, 400 that comprises the electronic paper display 104 can be made smaller and lighter because less hardware components are required and/or smaller hardware components may be used (e.g. because of a reduction in the processing required to render images on the electronic paper display and/or the reduction in energy consumption, which allows use of smaller processors and/or smaller batteries).

In the examples described above, the modified UI element tree is generated at runtime. In other examples, however, the modified UI element tree may be generated at compile time or as a subsequent re-compilation process. In various examples, the method may be implemented as a subsequent re-compilation process on any of the computing devices 100, 200, 300, 400 shown in FIGS. 1-4. In such an example, the UI conversion module 118 has access to the source code of the application (e.g. it may be stored in memory 108) or the UI may itself be stored only in markup language format (e.g. HTML or XAML) which is not compiled. Alternatively, the method may be implemented at compile time or as a subsequent re-compilation process on another computing device (e.g. as shown in FIG. 8) which does not attempt to use the output of the compilation/re-compilation but instead transmits that output so that it can be used later on a target device which runs the application software (and comprises the electronic paper display).

Figure 8:
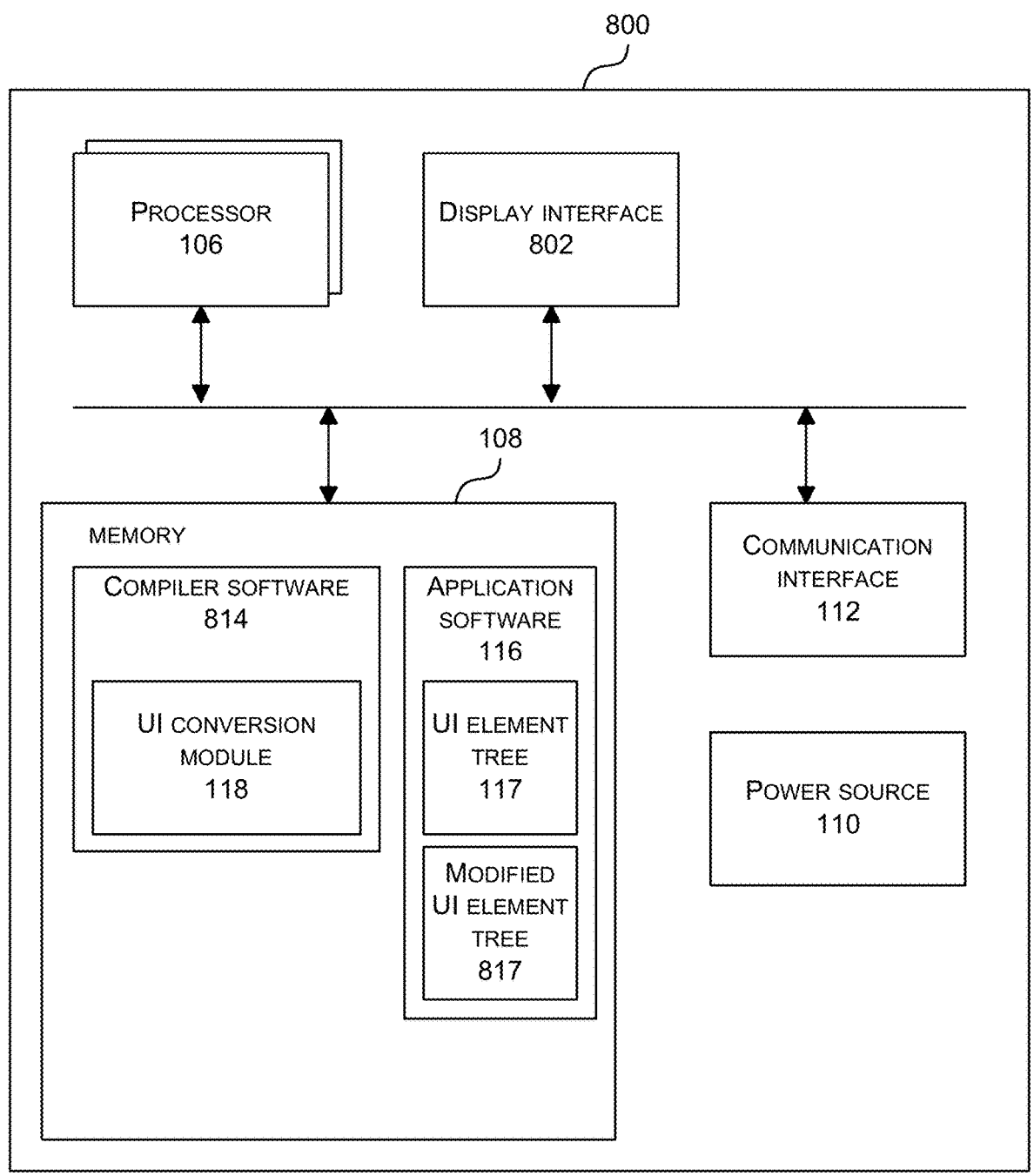
FIG. 8 shows a schematic diagram of a further example computing device which implements some or all of the method of FIG. 6.

FIG. 8 is a schematic diagram of another example computing device 800 which may implement some or all of the blocks of the method shown in FIG. 6 and described above. As described above, the method is not implemented at runtime but is instead implemented at compile time for the application software or as a subsequent re-compilation process. As shown in FIG. 8, the UI conversion module 118 may form part of a compiler (or re-compiler) 814 or may be called (i.e. triggered) by the compiler software 814. In response to a trigger (received in block 602 and generated by the compiler software 814), the UI conversion module 118 accesses the original UI element tree 117 (in block 602) and, as described above, generates a modified UI element tree 817 (in block 606) which may be stored with the compiled application software in addition to, or instead of, the original UI element tree 117. In such an example, the UI conversion module 118 has access to the source code of the application (e.g. it may be stored in memory 108) or the UI may itself be stored only in markup language format (e.g. HTML or XAML) which is not compiled. The computing device 800 may also comprise additional functional elements in addition to those shown in FIG. 8 (e.g. an input/output controller, a user input device, etc.).

By using the method described herein to modify the UI element tree at runtime, compile time or any time in between (e.g. to recompile an application) the user experience of the application is improved and multi-screen use of an application (i.e. use of the application on multiple different types of display) is enabled.

The computing device 100 described above may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (RGB) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

The examples described above and shown in FIGS. 1 and 2 are provided as examples and not as limitations. As those skilled in the art will appreciate, the present examples are suitable for application in a variety of different types of systems comprising a computing device with two displays and although not shown in the examples described above, a computing device may have more than two displays and the displays may be integral to the computing device 100 or peripheral devices which are connected to the computing device.

Alternatively or in addition to the other examples described herein, examples include any combination of the following further examples or aspects thereof.

A first further example provides a computing device comprising: an electronic paper display; a processor; and a memory arranged to store platform software and application software for at least one application that is not adapted to work with an electronic paper display, and wherein the platform software comprises a UI conversion module comprising device-executable instructions, which when executed by the processor, cause the processor to: access a UI element tree for the application; generate a modified UI element tree for the application by removing and/or re-styling at least one UI element; and render data from the application using the modified UI element tree for display on the electronic paper display.

The computing device may further comprise an emissive display or an interface permitting direct control of an emissive display.

The platform software may further comprise device-executable instructions, which when executed by the processor, cause the processor to: output the data rendered using the modified UI tree to the electronic paper display.

The computing device may further comprise a detachable portion comprising the electronic paper display. The detachable portion may further comprise: a power source; a display data store arranged to store a set of inter-related re-rendered UI images for the application generated by the UI conversion module; and a processor arranged to select and display one of the stored re-rendered UI images on the electronic paper display. The detachable portion may further comprise: a user input device; and wherein processor is arranged to select and display one of the re-rendered UI images on the electronic paper display in response to an input received via the user input device.

The modified UI element tree may be generated based on characteristics of the electronic paper display. The characteristics may comprise one or more of: dynamic range; resolution; update rate; aspect ratio and input sensing capabilities.

The modified UI element tree may be generated by removing at least one UI element that is not supported by the electronic paper display and/or re-styling at least one UI element dependent upon interactivity provided by the electronic paper display.

The modified UI element tree may be generated by expanding a view of the application to display to remove a scroll bar and using a pagination strategy to create a plurality of re-rendered UI images from the expanded view. The plurality of re-rendered UI images may be partially overlapping.

The modified UI element tree may be generated by capturing a navigable set of data from the application and using a pagination strategy to create a plurality of re-rendered UI images from the captured data.

The platform software may further comprise device-executable instructions, which when executed by the processor, cause the processor to: cache the data rendered using the modified UI tree in a display data store for subsequent display on the electronic paper display.

The UI conversion module may further comprise device-executable instructions, which when executed by the processor, cause the processor to: check if the rendered data satisfies a target rendering fidelity; and in response to determining that the rendered data does not satisfy the target rendering fidelity, to further modify the UI element tree for the application and re-render the data from the application using the further modified UI element tree.

The platform software may further comprise device-executable instructions, which when executed by the processor, cause the processor to: generate a signal to trigger generation of the modified UI element tree by the UI conversion module. The signal may be generated in response to a user input or in response to a change in state or anticipated change in state of the computing device.

A second further example provides a method of generating data for display on an electronic paper display, the data relating to an application that is not adapted to work with an electronic paper display and the method comprising: accessing a UI element tree for the application; generating a modified UI element tree for the application by removing and/or re-styling at least one UI element; and rendering data from the application using the modified UI element tree for display on the electronic paper display.

The method may further comprise outputting the data rendered using the modified UI tree to the electronic paper display.

Generating a modified UI element tree for the application by removing and/or re-styling at least one UI element may comprise at least one of: removing at least one UI element that is not supported by the electronic paper display; re-styling at least one UI element dependent upon interactivity provided by the electronic paper display; and expanding a view of the application to display to remove an interactive control and processing the expanded view to create a plurality of re-rendered UI images from the expanded view.

A third further example provides a computing device comprising: a processor; and a memory arranged to store compiler software and application software for at least one application that is not adapted to work with an electronic paper display, and wherein the compiler software comprises a UI conversion module comprising device-executable instructions, which when executed by the processor, cause the processor to: access a UI element tree for the application; generate a modified UI element tree for the application by removing and/or re-styling at least one UI element; and store the modified UI element tree for use in rendering data from the application for display on an electronic paper display.

A fourth further example provides a system comprising a computing device and a detachable module, the detachable module comprising an electronic paper display and the computing device comprising: a processor; and a memory arranged to store platform software and application software for at least one application that is not adapted to work with an electronic paper display, and wherein the platform software comprises a UI conversion module comprising device-executable instructions, which when executed by the processor, cause the processor to: access a UI element tree for the application; generate a modified UI element tree for the application by removing and/or re-styling at least one UI element; and render data from the application using the modified UI element tree for display on the electronic paper display.

The computing device may further comprise an emissive display or an interface permitting direct control of an emissive display.

A fifth further example provides a computing device comprising: a processor; and a memory arranged to store application software for at least one application that is not adapted to work with an electronic paper display and software comprising a UI conversion module, wherein the UI conversion module comprises device-executable instructions, which when executed by the processor, cause the processor to: access a UI element tree for the application; and generate a modified UI element tree for the application by removing and/or re-styling at least one UI element.

The computing device may further comprise an electronic paper display and wherein the software comprises platform software and the UI conversion module may additionally comprise device-executable instructions, which when executed by the processor, cause the processor to: render data from the application using the modified UI element tree for display on the electronic paper display. The computing may further comprise an emissive display or an interface permitting direct control of an emissive display. The platform software may further comprise device-executable instructions, which when executed by the processor, cause the processor to: output the data rendered using the modified UI tree to the electronic paper display. The computing device may further comprise: a detachable portion comprising the electronic paper display. The detachable portion may further comprise: a power source; a display data store arranged to store a set of inter-related re-rendered UI images for the application generated by the UI conversion module; and a processor arranged to select and display one of the stored re-rendered UI images on the electronic paper display. The detachable portion may further comprise: a user input device; and wherein processor may be arranged to select and display one of the re-rendered UI images on the electronic paper display in response to an input received via the user input device. The platform software may further comprise device-executable instructions, which when executed by the processor, cause the processor to: generate a signal to trigger generation of the modified UI element tree by the UI conversion module. The signal may be generated in response to a user input or in response to a change in state or anticipated change in state of the computing device.

The software may comprise compiler software and the UI conversion module additionally comprising device-executable instructions, which when executed by the processor, cause the processor to: store the modified UI element tree for use in rendering data from the application for display on an electronic paper display.

The UI conversion module in the fifth further example may further comprise device-executable instructions, which when executed by the processor, cause the processor to: check if the rendered data satisfies a target rendering fidelity; and in response to determining that the rendered data does not satisfy the target rendering fidelity, to further modify the UI element tree for the application and re-render the data from the application using the further modified UI element tree.

In the fifth further example the modified UI element tree may be generated based on characteristics of the electronic paper display. The characteristics may comprise one or more of: dynamic range; resolution; update rate; aspect ratio and input sensing capabilities.

In the fifth further example the modified UI element tree may be generated by one or more of: removing at least one UI element that is not supported by the electronic paper display; re-styling at least one UI element dependent upon interactivity provided by the electronic paper display; expanding a view of the application to display to remove a scroll bar and using a pagination strategy to create a plurality of re-rendered UI images from the expanded view; and capturing a navigable set of data from the application and using a pagination strategy to create a plurality of re-rendered UI images from the captured data.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. Examples of tangible storage media include computer storage devices comprising computer-readable media such as disks, thumb drives, memory etc. and do not include propagated signals. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computing device comprising:
an electronic paper display;
a processor; and
a memory coupled to the processor, the memory having stored thereon platform software and application software for at least one application that includes UI elements not adapted for display on an electronic paper display, and
wherein the platform software comprises
a UI conversion module comprising device-executable instructions, which when executed by the processor, cause the processor to:
  access a UI element tree for the application;
  determine that the electronic paper display does not support an interaction corresponding to a first UI element type
  in response to determining that the electronic paper display does not support an interaction corresponding to the first UI element type,
  generate a modified UI element tree for the application by
    greying out a first UI element of the first UI element type that corresponds to the interaction that is not supported by the electronic paper display and support
    modifying display parameters of a second UI element based on a visual property of the electronic paper display; and
  render data from the application using the modified UI element tree for display on the electronic paper display;
  wherein the electronic paper display is a multi-stable display that reflects light.

2. The computing device according to claim 1, wherein the platform software further comprises device-executable instructions, which when executed by the processor, cause the processor to:
  output the data rendered using the modified UI tree to the electronic paper display.

3. The computing device according to claim 1, further comprising:
  a detachable portion comprising the electronic paper display.

4. The computing device according to claim 3, wherein the detachable portion further comprises:
  a power source;
  a display data store arranged to store a set of inter-related re-rendered UI images for the application generated by the UI conversion module; and
  a processor arranged to select and display one of the stored re-rendered UI images on the electronic paper display.

5. The computing device according to claim 3, wherein the detachable portion further comprises:
  a user input device; and
  wherein processor is arranged to select and display one of the re-rendered UI images on the electronic paper display in response to an input received via the user input device.

6. The computing device according to claim 1, wherein the modified UI element tree is generated based on characteristics of the electronic paper display.

7. The computing device according to claim 6, wherein the characteristics comprise one or more of: dynamic range; resolution; update rate; aspect ratio and input sensing capabilities.

8. The computing device according to claim 1, wherein the modified UI element tree is generated by re-styling the second UI element dependent upon interactivity provided by the electronic paper display.

9. The computing device according to claim 1, wherein the modified UI element tree is generated by expanding a view of the application to display to remove a scroll bar and using a pagination strategy to create a plurality of re-rendered UI images from the expanded view.

10. The computing device according to claim 9, wherein the plurality of re-rendered UI images are partially overlapping.

11. The computing device according to claim 1, wherein the modified UI element tree is generated by capturing a navigable set of data from the application and using a pagination strategy to create a plurality of re-rendered UI images from the captured data.

12. The computing device according to claim 1, wherein the platform software further comprises device-executable instructions, which when executed by the processor, cause the processor to:
  cache the data rendered using the modified UI tree in a display data store for subsequent display on the electronic paper display.

13. The computing device according to claim 1, wherein the UI conversion module further comprises device-executable instructions, which when executed by the processor, cause the processor to:
  check if the rendered data satisfies a target rendering fidelity; and
  in response to determining that the rendered data does not satisfy the target rendering fidelity, to further modify the UI element tree for the application and re-render the data from the application using the further modified UI element tree.

14. The computing device according to claim 1, wherein the platform software further comprises device-executable instructions, which when executed by the processor, cause the processor to:
  generate a signal to trigger generation of the modified UI element tree by the UI conversion module.

15. The computing device according to claim 14, wherein the signal is generated in response to a user input or in response to a change in state or anticipated change in state of the computing device.

16. A method of generating data for display on an electronic paper display, the data relating to an application that includes UI elements not adapted to for display on an electronic paper display and the method comprising:
  accessing a UI element tree for the application;
  determine that the electronic paper display does not support an interaction corresponding to a first UI element type;
  in response to determining that the electronic paper display does not support an interaction corresponding to the first UI element type,
    generating a modified UI element tree for the application by
      greying out a first UI element of the first UI element type that corresponds to the interaction that is not supported by the electronic paper display and modifying display parameters of a second UI element based on a visual property of the electronic paper display; and
    rendering data from the application using the modified UI element tree for display on the electronic paper display;
  wherein the electronic paper display is a multi-stable display that reflects light.

17. The method according to claim 16, further comprising:
  outputting the data rendered using the modified UI tree to the electronic paper display.

18. The method according to claim 16, wherein generating a modified UI element tree for the application comprises:

re-styling the second UI element dependent upon interactivity provided by the electronic paper display; and expanding a view of the application to display to remove an interactive control and processing the expanded view to create a plurality of re-rendered UI images from the expanded view.

19. A computing device comprising: a processor; and a memory arranged to store compiler software and application software for at least one application that includes UI elements not adapted for display on an electronic paper display, and wherein the compiler software comprises a UI conversion module comprising device-executable instructions, which when executed by the processor, cause the processor to:

access a UI element tree for the application;

determine that the electronic paper display does not support an interaction corresponding to a first UI element type;

in response to determining that the electronic paper display does not support an interaction corresponding to the first UI element type, generate a modified UI element tree for the application by greying out a first UI element of the first UI element type that corresponds to the interaction that is not supported by the electronic paper display and modifying display parameters of a second UI element based on a visual property of the electronic paper display; and store the modified UI element tree for use in rendering data from the application for display on the electronic paper display;

wherein the electronic paper display is a multi-stable display that reflects light.

* * * * *